United States Patent [19]

De Longis et al.

[11] 4,449,800
[45] May 22, 1984

[54] PORTABLE OVERHEAD PROJECTOR

[75] Inventors: Vincent E. De Longis, Yonkers, N.Y.; Henry Kyhl, Leonia, N.J.

[73] Assignee: buhl Industries, Inc., Hawthorne, N.J.

[21] Appl. No.: 461,164

[22] Filed: Jan. 26, 1983

[51] Int. Cl.³ .............................................. G03B 21/30
[52] U.S. Cl. ............................. 353/119; 353/DIG. 3
[58] Field of Search .............. 353/24, 72, 98, DIG. 3, 353/DIG. 4, 119, 100, 101

[56] References Cited

U.S. PATENT DOCUMENTS

| | | | |
|---|---|---|---|
| 2,718,171 | 9/1955 | Fitzgerald | 353/DIG. 3 X |
| 2,767,611 | 10/1956 | Fitzgerald | 353/DIG. 3 X |
| 3,167,998 | 2/1965 | Appledorn et al. | 353/DIG. 3 X |
| 3,209,646 | 10/1965 | Appledorn et al. | 353/98 |
| 3,366,005 | 1/1968 | Benedict | 353/DIG. 3 X |

*Primary Examiner*—Harry N. Haroian
*Attorney, Agent, or Firm*—McAulay, Fields, Fisher, Goldstein & Nissen

[57] ABSTRACT

A portable overhead projector comprises a rectangular box-like housing having an open top and four side walls, a projecting lamp disposed in the housing and a planar fresnel lens. The fresnel lens is mounted in the housing for pivotal movement from a storage position wherein the fresnel lens is adjacent the open top of the housing to an operative position wherein the fresnel lens is spaced above the open top of the housing and the projecting lamp. A projecting head assembly is mounted to the housing when the fresnel lens is in the operative position to dispose the projecting head assembly thereabove and a cover is connectable to the housing for covering the fresnel lens when in the storage position.

10 Claims, 3 Drawing Figures

PORTABLE OVERHEAD PROJECTOR

BACKGROUND OF THE INVENTION

The present invention relates to a portable overhead projector and in particular to an overhead projector which can be collapsed into a single rectangular box-like housing.

Portable overhead projectors are known, however the housings therefor are generally bulky. Other portable overhead projectors are not easily collapsable and assemblable and therefore are difficult to use.

SUMMARY OF THE INVENTION

The main object of the present invention is to overcome the disadvantages of conventional portable overhead projectors and to provide a portable overhead projector which is compact, easily carried and which is easily assembled and collapsed.

These and other objects of the present invention, are achieved in accordance with the present invention by a portable overhead projector comprising a rectangular box-like housing having an open top and four side walls and means mounting a fresnel lens in the housing for pivotal movement from a storage position wherein the fresnel lens is adjacent the open top of to the housing, to an operative position wherein the fresnel lens is spaced above the open top of the housing and optically aligned with a projecting lamp disposed within the housing. The projecting head assembly is mounted to the housing so that it is disposed above the fresnel lens when the fresnel lense is in the operative position. A cover is connectable to the housing for covering the fresnel lens and stage glass when in the storage position.

The means mounting the fresnel lens comprises a parallelogram type hinged assembly wherein a rectangular lens frame holding the lens is hingedly connected along one edge thereof to the upper portion of a first side wall of the housing by a first member and wherein a second member hingedly connects the opposite edge of the frame to the housing inwardly of a second side wall opposite the first side wall.

The first member is advantageously configured to form a portion of the cover when the lens is pivoted into the storage position. The second member is advantageously configured to have vent holes therein for venting air from the projector lamp disposed below the fresnel lens.

The projecting head assembly is advantageously mounted by a support arm fixed to the first member so as to be disposed in a generally upward direction when the lens is in the operative position and to be disposed in the plane of the cover when the frame is in the storage position. The cover advantageously includes an indentation in the surface thereof for receiving the support bar when the lens is in the storage position so as to make the entire housing extremely compact.

A compartment is formed between the second side wall and a separator wall disposed at the hinge connection of the second member to the housing to define a storage compartment for the projecting head assembly and electrical line cord.

Means are also provided for maintaining the lens in the operative position to prevent the inadvertent collapse thereof.

These and other features and advantages of the present invention will be described in more detail with respect to the foregoing detailed description along with the attached drawings, wherein:

DETAILED DESCRIPTION OF THE INVENTION

Figure 1:
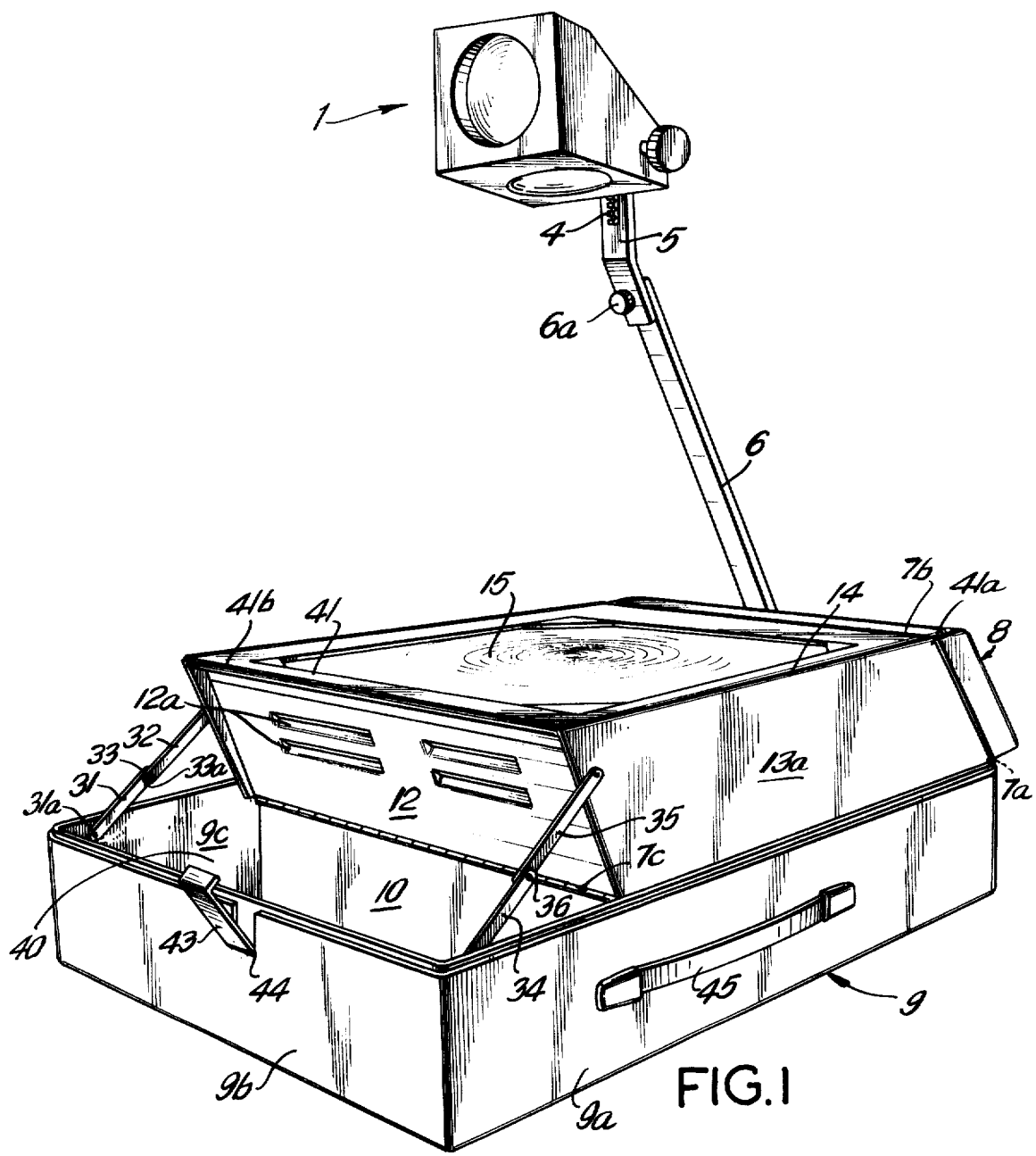
FIG. 1 is a perspective view of the portable overhead projector according to the invention in the assembled state.
Figure 2:
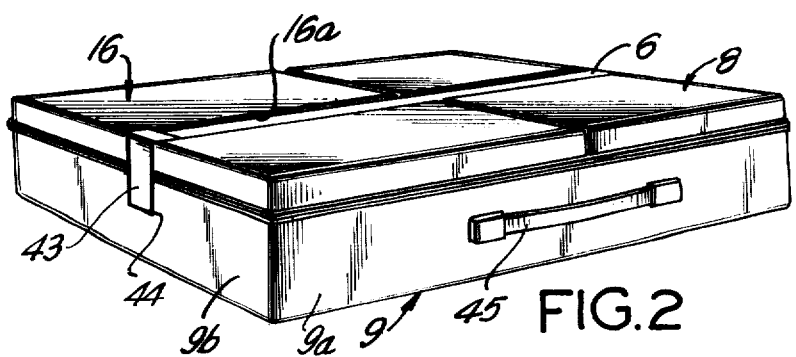
FIG. 2 is a perspective view of the invention in the collapsed state.
Figure 3:
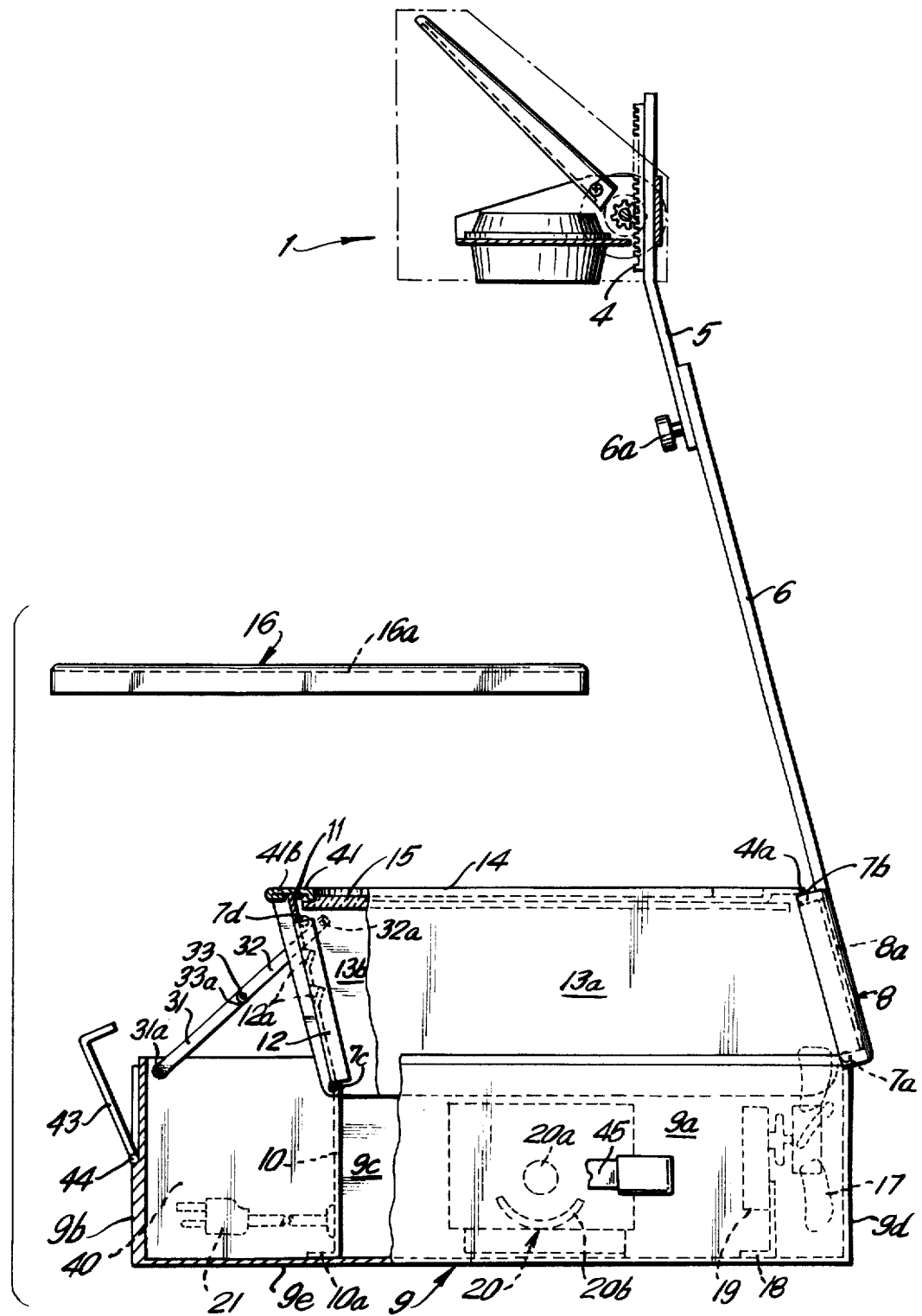
FIG. 3 is a partial sectional view of the projector of FIG. 1.

Referring now to FIGS. 1—3, the overhead projector according to the present invention includes a rectangular box-like housing 9 having a bottom wall 9e and four side walls 9a–9d. Mounted within the housing 9 is the projector lamp housing 20 with a suitable lamp 20a and reflector 20b disposed therein, a fan motor 19 mounted on a fan bracket 18 and having fan blades 17 attached thereto. The motor and projecting lamp are powered by house current which is obtained by use of power cord 21.

The other essential elements of the overhead projector include the planar fresnel lens 15 and the projecting head assembly 1 which is mounted by a rack and pinion gear assembly 4 on a rack arm 5.

The fresnel lens 15 is mounted by means including frame 41 and has a glass stage 14 disposed thereabove. In the preferred embodiment, the frame 41 is mounted in the manner of a parallelogram (although other configurations may be used) for movement from the position shown in FIG. 1 wherein the lens 15 is disposed above the top of the housing 9 in an operating position wherein it is optically aligned with the lamps to a position wherein the lens is disposed approximately in the plane of the opening of housing 9 to define a storage position whereby cover 16 can be placed thereover in the position shown in FIG. 2.

The means mounting frame 41 includes a first member 8 having hinge 7a connecting the same to the upper portion of side wall 9d and hinge 7b connecting the same to edge 41a of frame 41. A second member 12 has a bracket 11 connected thereto by means of hinge 7d with bracket 11 also connected to end portion 41b of frame 41. In a preferred embodiment the housing includes a separating wall 10. The opposite edge of member 12 is hinged to separating wall 10 which is connected via a flange 10a to the bottom wall 9e of housing 9.

Disposed on either side of the frame 41 are sidewalls 13a and 13b which provide a light tight box surrounding the light path between the projecting lamp and the lens 15.

In order to releasably lock the lens and frame in the operating position shown in FIG. 3, locking means are provided including two pairs of levers 31, 32 and 34, 35. Lever 31 is pivoted at 31a to side wall 9c and lever 32 is pivoted at 32a to hood wall 13b. The two levers are pivoted together at 33 and lever 32 includes a projection 33a which prevents the further pivoting thereof outwardly of the housing 9. The other lever arms 34 and 35 have similar pivot points including central pivot point 36.

In order to provide for venting of the hot air from the projection lamp, member 12 is provided with vent openings 12a.

The separating wall 10 also provides the function of forming a compartment 40 for holding the projecting head assembly 1 and for storing line cord 21 when these elements are not in use.

In order to support the projecting head assembly 1 during use, arm 6 is provided which is fixedly connected to member 8 in an indentation 8a in the surface thereof. Member 8 is configured to form a portion of the cover of the housing 9 and lies in the plane of the opening of housing 9 when the lens is in the storage position as shown in FIG. 2. Cover 16 also includes an indentation 16a so that the arm 6 can be received therein when the projector is collapsed and shown in FIG. 2 and the housing wall 9b includes a spring biased latch 43 spring pivoted at 44 to move from an open position shown in FIG. 3 to a locking position shown in FIG. 2 so as to keep cover member 16 in place. The latch 43 cooperates with indentation 16a in cover 16.

The support arm 6 is therefore advantageously disposed in the generally upward direction when the lens and frame are in the operative position shown in FIGS. 1 and 3 and in a compact collapsed state when the fresnel lens and frame are in the storage position shown in FIG. 2.

The housing 9 is also provided with a conventional handle 45 so that the projector can be carried around like a suitcase or attache case.

In operation, the cover is removed and the forward edge of the frame 41 is grasped and pulled upwardly. Accordingly, first and second members 8 and 12 respectively pivot about hinges 7a and 7c to raise the fresnel lens to the operativing position, the top panel thereof pivoting about respective hinges 7b and 7d. The levers or over-the-center toggle brackets 31, 32 and 34, 35 are pushed into alignment to maintain the frame in the open position. The lens and lamp housing are sized and positioned so the lens is in optical alignment with the lamp when the frame 41 is in the operating position. The arm 5 is connected to support arm 6 via screw 6a and the projecting head assembly 1 is fixed at the proper height to obtain an in-focus picture.

The above procedure may be reversed to close the projector. It is noted that a slight space is left between the ends of the separating wall 10 and side walls 9a and 9c to permit hood walls 13a and 13b to slide forwardly therebetween as the frame 41 is moved to the storage position.

It will be appreciated that the instant specification and claims are set forth by way of illustration and not limitation, and that various modifications and changes may be made without departing from the spirit and scope of the present invention.

What is claimed is:

1. A portable overhead projector comprising:
   a housing having an open top, a first side wall, a second side wall, a third side wall, and a fourth side wall, said sidewalls defining said housing, said first side wall and said second side wall being opposite each other, and said third side wall and said fourth side wall being opposite each other;
   a projecting lamp disposed in the housing;
   a planar lens;
   lens mounting means for mounting the lens on the housing for pivotal movement from a storage position wherein the lens is adjacent the open top of the housing to an operative position wherein the lens is spaced above the open top of the housing and the projecting lamp, said lens mounting means including a rectangular lens frame, a first member hingedly connected to one edge of the frame and to the upper portion of the first side wall, and a second said member hingedly connected to the opposite edge of the frame and to said housing at a point spaced from said second side wall;
   a projector head assembly;
   projector mounting means for operationally mounting the projector head assembly on the housing when the lens is in the operative position to dispose the projector head assembly thereabove; and
   a cover connectable to the housing for covering the lens when in the storage position.

2. The projector according to claim 1, wherein said housing is of rectangular box-like shape, and said lens comprises a fresnel lens.

3. The projector according to claim 2, wherein the distance between the hinged connections of said first member is equal to the distance between the hinged connections of said second member, said distance being equal to the spacing between the second sidewall and the hinged connection of the second member to the housing.

4. The projector according to claim 2, wherein the first member is configured to form a portion of the cover when the lens is pivoted into the storage position.

5. The projector according to claim 2, wherein the second member is rectangular and has vent holes therein.

6. The projector according to claim 2, further comprising a separating wall disposed at the connection of the second member to the housing to define a storage compartment for the projector head assembly.

7. The projector according to claim 2, further comprising means for releasably locking the lens into the operative position.

8. The projector according to claim 8, wherein the releasable locking means comprises at least one pair of lever arms pivotably connected together at one end and pivotally connected to the frame and housing at the other ends thereof.

9. The projector according to claim 1, wherein the means mounting the projector head assembly comprises a support arm fixed to the first member to be disposed in the plane of the cover when the frame is in the storage position and to be disposed generally upwardly when the lens is in the operative position and means for connecting the projector head assembly to the support arm when in the upward position.

10. The projector according to claim 9, wherein the cover includes the first member and comprises a rectangular box-like member positionable on the top of the housing adjacent the first member to completely cover same and includes an indentation in the surface thereof for receiving the support arm.

* * * * *